United States Patent [19]
Panto et al.

[11] 4,398,915
[45] Aug. 16, 1983

[54] BLEED RESISTANT COLORED CELLULOSICS AND THE METHOD OF THEIR PREPARATION

[75] Inventors: Joseph S. Panto, Dover; Ernest R. Kaswell, Waban, both of Mass.

[73] Assignee: Albany International Corp., Albany, N.Y.

[21] Appl. No.: 337,410

[22] Filed: Jan. 6, 1982

[51] Int. Cl.³ .............................................. C09B 62/00
[52] U.S. Cl. ........................................ 8/543; 8/561; 8/562; 8/649; 8/919
[58] Field of Search ................ 8/543, 657, 919, 561, 8/562

[56] References Cited

U.S. PATENT DOCUMENTS

| | | | |
|---|---|---|---|
| 3,304,297 | 2/1967 | Westmann et al. | 8/528 |
| 3,337,288 | 8/1967 | Horisuchi et al. | 8/506 |
| 3,597,322 | 8/1971 | Babson | 536/50 |
| 4,167,422 | 9/1979 | Bellanca et al. | 426/250 |
| 4,297,099 | 10/1981 | Simon et al. | 8/506 |

Primary Examiner—A. Lionel Clingman
Attorney, Agent, or Firm—Kane, Dalsimer, Kane, Sullivan & Kurucz

[57] ABSTRACT

There is disclosed a method for bleed-resistant coloring of cellulosic materials. The method comprises cross-linking to the cellulosic a water-insoluble colorant particle which is the cross-linkable reaction product of an organic polymer such as starch with a reactive dye compound. Representative of reactive dye compounds are Procion red, blue and yellow. Advantageous cross-linkers are urea-formaldehyde and melamine-formaldehyde resins. The cellulose materials colored by the method of the invention are new and are characterized-in-part in that they are bleed resistant.

7 Claims, 1 Drawing Figure

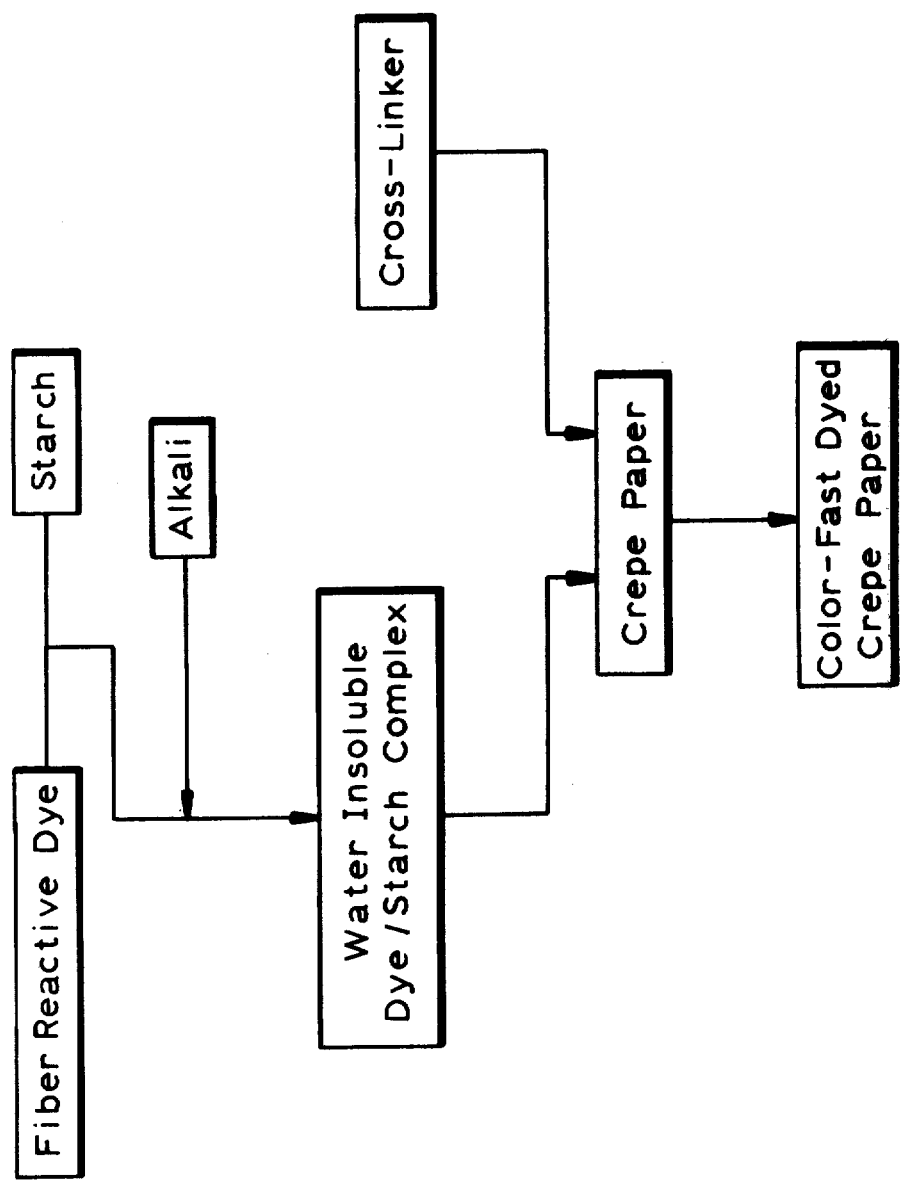

BLEED RESISTANT COLORED CELLULOSICS AND THE METHOD OF THEIR PREPARATION

BACKGROUND OF THE INVENTION

1. Field of the Invention

The invention relates to the coloring of cellulosics, inclusive of color printing techniques, and more particularly relates to the coloring of cellulosics with chemically reactive colorants to obtain bleed resistant, colored, cellulosic articles.

2. Brief Description of the Prior Art

The U.S. Pat. Nos. 1,732,540; 1,805,013; 1,863,813; 1,871,647; and 1,871,769 are representative of descriptions of prior art methods and practices for preparing so-called color fast, colored cellulosic articles. In spite of the known art for preparing colored cellulosic articles, there is a considerable amount of commercially available articles such as crepe paper, colored with dyes, that "bleed" when put into contact with water. By "bleeding" we mean that the color leaches out of the papers with water and may stain whatever the wet paper comes in contact with. This effect is considered undesirable for many uses of crepe paper. Apparently, the known prior art methods of preparing color fast dyed cellulosics have not been found practical, sufficient or efficient for present day practices and needs.

Prior to our invention, a class of dyes (reactive dyes for cellulosics) were known, which react with free hydroxyl groups on cellulosic fibers to cause a coloring thereof. However, the fiber must be free of contaminants, such as starch, which would also react with the dye to form colored insoluble particles on the fiber surface. These color particles will subsequently wash off the fiber surface and represent a waste of dye component. Another disadvantage is found in the long reaction times needed to affect coloration, i.e.; 20 to 30 minutes at elevated temperatures. In another way, to use such dyes (to dye paper for example), this class of reactive dye may be added to paper pulp in the beater stage to permit reaction with the cellulose over a prolonged period of time. The dyed pulp is then made into a paper sheet. The resulting colored paper is color fast (bleed resistant). The disadvantage of this approach is that a considerable amount of a given colored paper has to be made at one time (for economic reasons), and thus an inventory must be maintained until demand depletes it. This is a costly procedure.

By the method of this invention the reactive dyes are first reacted with an organic polymer such as starch and the resulting dye-starch (colorant) particles are then used to impregnate preformed cellulosic articles such as crepe paper. A cross-linking agent is then used to chemically crosslink the dye-starch colorant particles to the crepe paper. The result is a colored crepe paper sheet which resists "bleeding" when placed in contact with water. There is an efficiency in the amount of dye effectively coupled to the cellulosic. The method of the invention is economical and may be used in a conventional plant for commercial coloration, without purchasing new equipment or modifying that already in existence. Reaction times required are relatively short, an unexpected advantage. The method of the invention may also be carried out rapidly at relatively low temperatures. Thus there are operating and economic advantages. The coloring approach described above may be used on a wide variety of woven and non-woven disposable cellulosic items where non-bleeding is a useful factor (for example tissue paper, towelling, crepe paper, rayon sheets and the like).

Our observations made while coloring crepe paper indicated that the colorant dispersions used in the method of the invention can be used for printing on surfaces of cellulosic articles. Prior to the invention, a considerable amount of color printing on low cost substrates was accomplished with either resin bonded pigments or solvent based inks. Both of these systems operate on a common principle, that is, attachment of the colorant to a substrate using a binder. Resin bonded systems are comprised of highly dispersed water insoluble pigments in water based emulsions. An acrylic emulsion is most commonly used in such systems. Preparation of the print paste involves addition of suitable thickeners to achieve good definition of the print, then drying to coalesce and adhere the pigment particles to the substrate. Solvent based systems are comprised of solvated dyes and lacquers. Preparation of the print paste involves addition of suitable thickeners to achieve good definition of print, then drying to evaporate the solvent and permit the lacquer to hold the colorant on the substrate. Both of the above described prior art systems are expensive. For the printing of low cost items such as non-wovens, paper, paperboard, gift wrapping paper, textiles or other disposable items, the method of our invention is advantageous since it adds little to the overall cost of manufacture. The method of the invention is not limited however to the coloring or printing of low cost disposable cellulosics but may be used to color even more expensive articles such as textile fabrics including woven, non-woven, knitted, pile and velvet fabrics, webs and yarns. By the method of the invention the printing of cotton fabrics is particularly advantageous. For example, the cotton fabric need not of necessity be pre-washed to remove starch contaminants as described above.

By the method of our invention a particular class of dyes referred to as "reactive dyes for cellulosics," which will react with starch or other organic polymers containing hydroxyl groups, are used to form insoluble colorant particles which may be used as a coloring or a printing medium. Due to the nature of the dyes' reactivity with starch, it has been found that upward adjustment of pH will cause an increase in viscosity. This eliminates the need for thickeners to achieve good definition of the print. A cross-linking agent is used to cross-link the dye-starch (colorant) particles to the cellulosic surface and render the printing "non-bleeding." The advantages are clear in that the water-based system used in the method of the invention produces a good print definition. This is of economic importance since currently used organic solvent based systems present occupational and fire hazards and problems of environmental pollution.

In addition, an inert flame retardant can be added to the print pastes or coloring mixtures used in the method of the invention to render cellulosic articles non-flammable. An "inert flame retardant" is one which does not enter into or adversely affect the desired course of the chemical reaction which comprises the method of the invention.

SUMMARY OF THE INVENTION

The invention comprises a method of coloring preformed cellulosic materials, which comprises; chemically cross-linking a water-insoluble colorant particle to the cellulosic material, said colorant particle being the reaction product of an organic polymer bearing substituent groups which are reactive with acid halides, and a reactive dye compound. The term "coloring" as used herein includes printing i.e.; the coloring of selected areas of a cellulosic article. The invention also comprises the bleed resistant colored products of the method of the invention and intermediate coloring materials used in their preparation.

BRIEF DESCRIPTION OF THE DRAWING

The accompanying drawing is a block diagram outlining a preferred embodiment method of the invention.

DETAILED DESCRIPTION OF THE PREFERRED EMBODDIMENTS OF THE INVENTION

In the accompanying diagram, there is illustrated schematically an embodiment method of the invention for coloring crepe paper to obtain a color-fast (bleed resistant) crepe paper. Although the method is described in regard to the coloring of crepe paper, it will be appreciated that the method of the invention applies to the coloring of any cellulosic article such as tissue paper, towelling and like articles.

Cellulosic articles may be colored by the method of the invention to obtain colored articles which resist color bleeding upon contact with water. The term "cellulosic article" as used herein means natural or synthetic preformed articles made from materials such as those containing a polymeric structure with repeating moieties of the formula:

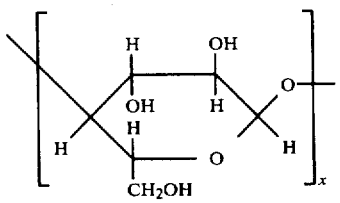

(I)

wherein x is an integer which is an average of about 3000. Representative of such cellulosic materials are cotton, paper, rayon and the like. The method of the invention is particularly advantageous for coloring crepe paper to obtain a color fast product, i.e.; colored crepe paper resistant to color bleeding.

The coloring of the cellulosic article is carried out by chemically cross-linking to the cellulosic, through its free hydroxyl groups, a water-insoluble colorant particle.

As illustrated in the accompanying drawing, the cellulosic (crepe paper) is impregnated with a water-insoluble colorant particle such as a dye/starch complex and the cellulosic bound to the colorant with a chemical cross-linker. The cellulosic can be impregnated with the other reactants separately in any order or sequence of addition or, preferably, the cross-linker is added to the mixture of the dye/starch component and the impregnation carried out in a single step. Impregnation may be carried out by conventional techniques such as by spraying the impregnants on the cellulosic, dipping the cellulosic in a bath of impregnant, kiss rollpad application and like techniques. The impregnants may also include besides the colorant and/or cross-linking agent conventional additives such as stabilizers, wetting agents, sizes, surfactants, anti-migration agents, fire retardants and the like commonly used in the art to dye or color cellulosic materials.

Following impregnation of the cellulosic, such as crepe paper, the desired cross-linking reaction is promoted by heating the impregnated cellulosic to a cross-linking temperature. In general, a cross-linking temperature is one within the range of from about 150° F. to 500° F. for periods of time between 10 seconds or less and an hour or more, depending on the particular heating techniques that are involved and the heat exchanging efficiencies that are realized. Heating may be carried out by exposure of the impregnated paper to radiant heaters and like heat sources.

The proportion of coloring reactants impregnated into the cellulosic for reaction therewith are important in regard to the degree of color fast coloration to be achieved. If a relatively light shade of coloration is desired, only a relatively small proportion of the cross-linking reagent is necessary to provide the cross-linked product. Thus, from 5 to 350 percent by weight of the cross-linking reagent, based on the weight of the colorant component, is generally adequate for the cross-linking purpose. Frequently, an amount of the cross-linking reagent that is between about 100 and 275 percent by weight, based on the weight of the colorant component may be employed with advantage. If precision is desired, the exact quantity of the cross-linking reagent for accomplishment of the intended purpose can be determined by trial and error technique. For a deeper shade of dyeing, more than 350 percent (by weight of dye) of cross-linker may be employed.

The cross-linking reaction which occurs may be illustrated in the schematic formula:

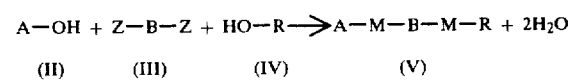

wherein the compound of formula (II) is a hydroxy containing, water-insoluble dye particle (described more fully hereinafter) where A is the residue after removal of the hydroxy group; the compound of formula (III) is a representative polyfunctional cross-linker wherein Z represents one of a hydroxyl group or an amino group and B represents a divalent organic moiety and the formula (IV) represents a hydroxy containing cellulosic material as described above; R being the residue of the cellulosic after removal of the hydroxyl group. The resulting product of formula (V) wherein M represents oxygen or the divalent group

is one wherein the dye compound (II) is chemically bound to the cellulosic (IV) so as to be color fast (bleed resistant).

The cross-linking reagent employed in the method of the invention may be a di- or polyfunctional compound, provided the functional groups are capable of a cross-linking reaction between the free hydroxyl groups on the cellulosic (see for example the formula (I) given above) and the reactive, functional groups on the organic polymer/dye complex such as that of formula (II) given above. Representative of such cross-linking reagents are diols and diamines of the formula:

$$Z-B-Z \qquad (III)$$

wherein B and Z are as defined above. B may be more specifically represented by organic moieties selected from the group consisting of (a) a straight chain, branched chain or cyclic alkylene radical containing from 2 to 12 carbon atoms and in which one or both of the Z groups may be present on a secondary carbon atom, (b) the group: $-(CH_2)_m-O-Y-O-(CH_2)_n-$ wherein Y is a divalent radical selected from the class consisting of straight chain alkylene groups, branched chain alkylene groups, cyclic alkylene groups and oxydialkylene groups and wherein m and n have the value 2 to 4.

(c) the group:

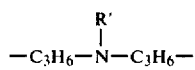

wherein R' is a lower alkyl or phenyl group, and (d) the group:

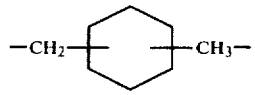

The diamines of class (a) above which may be satisfactorily employed in accordance with the invention are represented by ethylenediamine, 1,3-propanediamine, 1,2-propanediamine, 1,3-butanediamine, 1,5-hexanediamine, 1,3-diaminocyclohexane, 1,4-diaminocyclohexane, 1,3-cyclohexane-bis(methylamine) and the like.

The diamines of class (b) may be
3,3'-(ethylenedioxy)bis(propylamine),
3,3'-(2,2-dimethyltrimethylenedioxy)bis(propylamine),
3,3'-(cyclohexylene-1,4-dimethylenedioxy)bis(propylamine), of the formula:

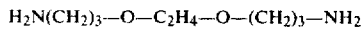

and the like.

Likewise the diamines of class (c) may be
3,3'-ethyliminobis(propylamine), 3,3'-phenyliminobis(propylamine) and the like.

Similarly, the diamines of class (d) may be o-, m-, and p-xylene-diamines and the like.

Diols of class (a) above are represented by ethylene glycol, 1,3-propanediol, 1,3-butanediol, 1,4-dihydroxycyclohexane and the like.

The diols of class (b) above may be poly(alkylene oxide)glycol or the like.

Diols of the class (c) given above are represented by 3,3'-ethyliminobis(propanol) and the like.

Diols of the class (d) given above are represented by O-, m-, p-xylene diols and the like.

Preferred cross-linkers (III) of the diol class are represented by dimethylol urea, dimethylol melamine, dimethylol methyltriazine, dimethylol cyclic ethylene urea (DCEU) and the like.

The cross-linking reagents may also be represented by polyamines of the formula:

wherein G may be any $C_2$ to $C_{10}$ aliphatic or $C_6$ to $C_{14}$ aromatic radical and n is a whole integer of at least 1. Polyamines that may be included in this category include for example hexamethylene tetramine, diethylene triamine, triethylene tetramine and the like. Other functionally equivalent polyamine compounds such as piperazine and the various substituted piperazines and melamine, in which the nitrogen atoms are part of a heterocyclic molecular structure, may also be utilized as cross-linking reagents in the method of the invention.

Advantageously, the cross-linking reagent may be an aldehyde type of material such as furfural or glyoxal and the like, or a urea-formaldehyde or melamine formaldehyde polymer condensate of the usual resin precursor variety, i.e, mono or dimethylolurea and the like. It is generally desirable to employ as the cross-linking reagent a polymer which is a urea-formaldehyde or melamine-formaldehyde polymer condensate such as those which have been previously used in the treatment of paper to increase or impart wet strength to the paper fibers. It is believed that such resin cross-linkers may form hydrogen bonds between the polymer chains, thereby increasing further the chemical bond strength; see Kird Othmer, Encyclopedia of Chemistry, Vol. 2, pages 254-255. These urea-formaldehyde and melamine-formaldehyde polymer condensates contain (generally) both free hydroxyl and free amino groups which may function in the desired cross-linking reaction. Although we are not to be bound by any theory of the mechanism involved, it is believed that the free hydroxyl groups predominate in the cross-linking reaction.

The colored cellulosic of formula (V) is bleed resistant.

The water-insoluble colorant particle of formula (II) described above is the reaction product of a polymer having substituent groups which are reactive with acid halides, and a reactive dye. The reaction may be represented schematically by the formula:

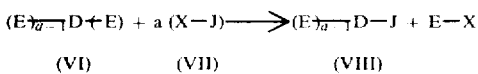

wherein D represents the residue of an organic polymer following removal of substituent groups E; E representing a chemical group which will react with an acid chloride. Representative of E are amine and hydroxyl groups. The symbol "a" represents an integer of at least 1, preferably 1 to 25. In the formula (VII), X represents halogen such as chlorine and bromine and J represents the residue of a reactive dye compound upon removal of a moiety X (the compound of formula (VII) being representative of a reactive dye). The product dye/insoluble polymer complex of formula (VIII) is representative of water insoluble dye particles of the formula (II) described above.

Representative of the organic polymer of the formula (VI) are naturally occurring or synthetic polymers having for example substituent amine and/or hydroxyl groups. Preferably hydroxyl groups are present. Among the natural polymers carrying hydroxyl groups may be mentioned cellulose, starch, dextrin and the like, and their partial esters and ethers as long as they still possess in their structure a substantial amount of free hydroxyl groups capable of reacting with acid chlorides, such as the hydroxyethyl and hydroxypropyl derivatives of cellulose and starch.

Cellulose derivatives such as carboxymethyl cellulose, phosphocellulose, sulfomethyl cellulose, sulfoethyl cellulose, para-aminobenzyl cellulose, aminoethyl cellulose, diethylaminoethyl cellulose, triethylaminoethyl cellulose; cross-linked gels of dextran-epichlorohydrin (hereinafter referred to for convenience as "dextran gel"); dextran gel derivatives such as carboxymethyl dextran gel and the like are also representative of the polymers of formula (VI) given above.

Synthetic condensation polymers (VI) carrying free hydroxyl groups are for instance polyamides carrying hydroxymethyl or hydroxyethyl substituents, and epoxy resins such as the polyether obtained by the polycondensation of 2,2-bis(4-hydroxyphenyl)-propane with epichlorohydrin.

Most preferred as the organic polymers of formula (VI) are the naturally occurring starches.

Starch, as the term is used herein, means the polysaccharide consisting of about 27 percent linear polymer of the formula:

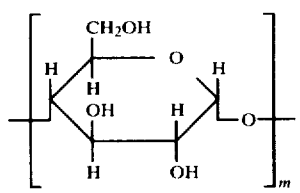
(X)

wherein m is an integer of from about 70 to about 2100; and 73 percent of a branched polymeric moiety made up of branched units of the formula (X) above, wherein m is an integer of 25 or less joined together in such a way that the free reducing group of a glucose unit of formula (X) at the end of one branch is glucosidically linked through the sixth carbon of glucose unit (not an end one) in an adjoining chain.

Reactive dyes for cellulosics of the formula (VIII) are a class of dyes having active, functional, halogen groups which will react with hydrogen atoms on, for example, starch, to form chemical bonds between the dye moiety and the starch substrate. Representative of reactive dyes are those described in U.S. Pat. Nos. 3,290,282 and 3,503,953 which also describe their preparation. Preferred reactive dyes are those of the formulae:

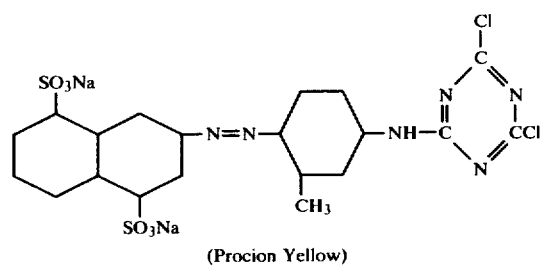
(Procion Yellow)

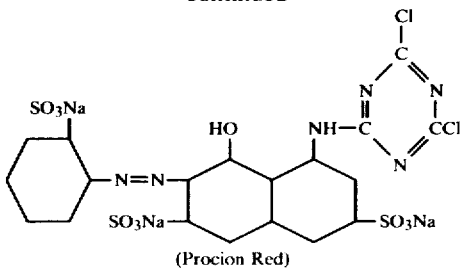
(Procion Red)

AND

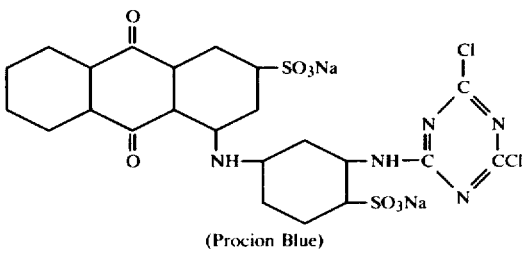
(Procion Blue)

and the like.

In the above-described reaction scheme between the organic polymer of formula (VI) and the reactive dye compound of formula (VII), a by-product of the formula (IX), i.e., for example a hydrogen halide may be formed. This acid by-product is advantageously neutralized by the presence of an alkali. Any alkali may be used, which will provide the desired neutralization. Representative of such alkali compounds are sodium hydroxide, lithium hydroxide, sodium triphosphate, sodium carbonate (soda ash) and the like.

The reaction between the organic polymer (VI) and the reactive dye (VII) may be carried out at room temperatures but is advantageously promoted by heating the reaction mixture, preferably within a range of from about 100° F. to about 200° F., most preferably circa 140° F., after admixture of the reactants (VI) and (VII). Admixture may be carried out by conventional technique, employing conventional reaction apparatus.

In the drawing of the accompanying figure, it is shown that in the preferred embodiment method of the invention, a reactive dye is reacted with starch in the presence of alkali to obtain the preferred dye/starch colorant particle. The colorant particles obtained are impregnated in a cellulosic for coloring as described previously. The same colorant particles prepared as described above may be used for printing on cellulosics and are basically the same as used for dyeing crepe paper except that more alkali (soda ash) is used to produce a desired viscosity. Any desired viscosity can be achieved by varying the proportion of alkali, as those skilled in the art will appreciate (viscosity increases as the pH is raised). In printing operations, these dyes are very suitable for use in the thermal process wherein the printing paste contains both the colorant and alkali and the print is cured by heating above 270° C. for 30 seconds or more. Thermal printing is a well known process and the techniques and apparatus are known and readily available.

An important advantage of the method and the articles of the invention is found in their compatibility with the presence of conventional, inert flame retardants. Thus, inert flame retardants conventionally used to impregnate cellulosic articles may be added to the coloring compositions used to color cellulosics in the method of the invention. The term "inert flame retardant" means a flame retardant compound or composition which does not enter into the above-described cross-linking reaction or otherwise adversely affect the desired course of the cross-linking.

The following examples describe the manner and process of making and using the invention and set forth the best mode contemplated by the inventors of carrying out the invention, but are not to be construed as limiting. Bleed resistance is determined by immersing a representative portion of the colored cellulosic article (crepe paper) in tap water and sandwiching the wet article between a top and bottom layer of white tissue paper which layers are subsequently saturated with tap water. After a period of about 10 minutes the sandwich is opened and the amount of bleed, ie; migration of colorant from the colored article to the upper and lower tissue layers noted. The article is deemed "bleed resistant" if no color migration is seen.

EXAMPLE 1

Ten grams of Clearfilm starch (thin cooking, noncongealing starch; National Starch and Chemical Corp.) is added to 50 ml of water and heated to 180° F. to dissolve the starch. The starch is cooked at a temperature of 180° F. for 10 minutes. Four grams of Procion Red MX-GBA (I.C.I. Americas, Inc., Wilmington, Del.) and 0.2 gram of soda ash are each separately dissolved in warm water and then added to the dissolved starch solution. The temperature of the starch-dye-soda ash mixture is then allowed to remain at 180° F. for 30 minutes while undergoing constant stirring. The mixture is then cooled to 140° F.

Twenty grams of Apex Flameproof #736 (Apex Chemical Co.) is dissolved in water at 140° F. This dissolved product is then added to the cooled starch-dye-soda ash mixture. Finally 10 grams of melamine-formaldehyde type resin (Parez 613 resin; American Cyanamid Co.) is added to the above mixture with stirring and maintained at 140° F. to obtain a dye mixture, red in color. Cellulosic paper is then dipped in the prepared dye mixture and then passed between squeeze rolls to remove excess dye. The impregnated colored sheet is then cured for 1.5 minutes at 350° F. The dry, colored cellulosic paper sheet is found to be resistant to colored bleeding.

EXAMPLE 2

Similarly, repeating the procedure of Example 1, supra., but replacing the Procion Red MX-GBA as used therein with an equal proportion of Procion Blue MX-2 GA (I.C.I. Americas Inc., supra) and increasing the proportion of soda ash to 0.6 gms, there is obtained a color fast, blue colored paper which is bleed resistant.

EXAMPLE 3

Similarly, repeating the procedure of Example 1, but replacing the Procion Red MX-GBA as used therein with an equal proportion of Procion Yellow MX-3 RA (I.C.I. Americas Inc., supra) there is obtained a yellow colored paper which is bleed resistant.

EXAMPLE 4

Ten grams of Clear film starch (National Starch and Chemnical Corp., supra) is first dissolved in 40 ml of water at a temperature of 180° F. Then after cooking at this temperature for 5 to 10 minutes, there is added four grams of Procion Yellow MX-3RA (I.C.I. Americas Inc., supra) and 0.6 grams soda ask (each separately dissolved in warm water). There is thus obtained a viscous mixture. Twenty grams of the fire retardant ammonium sulfamate (CM, E. I. DuPont de Nemours and Co; is dissolved in water at 140° F. This dissolved product is then added to the starch-dye-soda ash mixture. The addition causes a decrease in viscosity.

Finally, 10 grams of Parez 613 (supra) is added to the print paste and allowed to cool to room temperature. The product mixture is useful as a printing paste of yellow dye color. The print pastes are applied with a screen to paper stock. The prints are then cured at 350° F. for 1.5 minutes. The results show that the print pastes produce good coloration on the paper stock and that the cured printed stock does not color bleed when tested.

What is claimed is:

1. A method of coloring preformed cellulosic materials, which comprises; chemically cross-linking a water-insoluble colorant particle to the cellulosic material, said colorant particle being the reaction product of starch bearing substituent groups reactive with acid halides, and a reactive dye compound.

2. The method of claim 1 wherein the cross-linker is a urea-formaldehyde resin.

3. The method of claim 1 wherein the cross-linker is a melamine-formaldehyde resin.

4. A method of coloring preformed, fiberous paper articles, which comprises;
impregnating the paper with a colorant which is the reaction product of starch and a reactive dye compound; and
chemically cross-linking the colorant to the paper fibers;
the cross-linker being selected from the group consisting of a urea-formaldehyde and a melamine formaldehyde resin;
the colored article being color bleed resistant.

5. A colored cellulosic article having the chemical composition described by the formula:

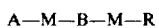

A—M—B—M—R wherein A is the residue of the reaction product of starch having substituent groups which are reactive with acid halides and a reactive dye; M is selected from the group consisting of oxygen and the divalent moiety of formula —NH—; B is a divalent organic moiety; and R is the residue of a cellulosic following removal of a hydroxyl group.

6. The article of claim 5 which is a bleed resistant, colored crepe paper.

7. A bleed resistant, colored paper which comprises; a fiberous sheet of paper having chemically cross-linked to the fibers thereof, a colorant which is the reaction product of starch and a reactive dye compound, said cross-linker being selected from the group consisting of urea-formaldehyde and melamine-formaldehyde.

* * * * *